April 25, 1944.      R. LAPSLEY      2,347,352

TRANSMISSION

Filed Feb. 20, 1941      2 Sheets-Sheet 2

INVENTOR.
Robert Lapsley
BY Walter E. Schirmer
ATTORNEY.

Patented Apr. 25, 1944

2,347,352

UNITED STATES PATENT OFFICE 2,347,352

TRANSMISSION

Robert Lapsley, Berrien Springs, Mich., assignor to Clark Equipment Company, Buchanan, Mich., a corporation of Michigan Application February 20, 1941, Serial No. 379,787

3 Claims. (Cl. 74—11)

This invention relates to transmissions and more particularly is directed to a transmission especially adapted for tractors and similar vehicles in which the transmission is mounted immediately forwardly of the rear axle differential integrally with the differential housing.

One of the primary objects of the present invention is to provide a compact transmission and power takeoff assembly in which the countershaft of the transmission has an extension passing through the differential housing and arranged to drive both a power takeoff and belt pulley for the tractor.

Another feature of the present invention is the novel type of clutching mechanism operable to clutch the power takeoff shaft and the belt pulley shaft simultaneously to the countershaft.

Still another feature of the present invention resides in the provision of a compound gear including a bevel gear, and an internal ring gear formed from the same forging and adapted to be driven from the countershaft gear for driving the belt pulley shaft and the power takeoff shaft.

In connection with the transmission itself, I have provided a novel arrangement of bearings for supporting the drive pinion shaft which constitutes the tail shaft of the transmission. It is well known that with spiral bevel gearing in which a pinion drives a bevel ring gear there is a normal tendency to thread the pinion gear out of engagement with the bevel gear, and consequently adequate bearing support must be provided for resisting this thrust. It has been customary heretofore to provide a double tapered roller bearing for this purpose, which bearing required appreciable axial length for positioning around the pinion shaft and also required extreme care in assembling with respect to the transmission end wall or web of the differential case in order to hold the bearing in position. Such bearings are relatively expensive, and, while a thrust in one direction must be resisted by the bearing, the other half of the bearing is not subjected to such a thrust but ordinarily has heretofore been provided because of the necessity of having bearing means to locate the parts from a reversal of loads due to spiral bevel action or other causes.

In the present invention, in place of the double tapered roller bearing, I preferably provide two single tapered roller bearings, one of sufficient size to resist the axial thrust imposed on the shaft by the spiral bevel gears, and the other of a smaller size to take care of radial loads and the relatively small thrusts in the opposite direction. Other types of anti-friction bearings can be substituted for the tapered roller type and still be retained in a similar manner. In assembling these bearings, I provide a relatively smooth bore through the transverse web or partition in the housing which is provided with an inwardly opening annular groove adapted to receive a split ring. By the use of such a ring the larger single tapered roller bearing can be locked in position in the bore between the teeth of the pinion gear and the ring, while the smaller bearing is locked in position between the ring and one of the gears of the reduction gearing in the transmission. This provides a very economical construction which is simple to assemble and which eliminates certain of the machining operations formerly required with a double tapered roller bearing.

Other objects and advantages of the present invention will apepar more fully from the following detailed description which, taken in conjunction with the accompanying drawings, will disclose to those skilled in the art the particular construction and operation of a preferred form of the present invention.

Figure 1:
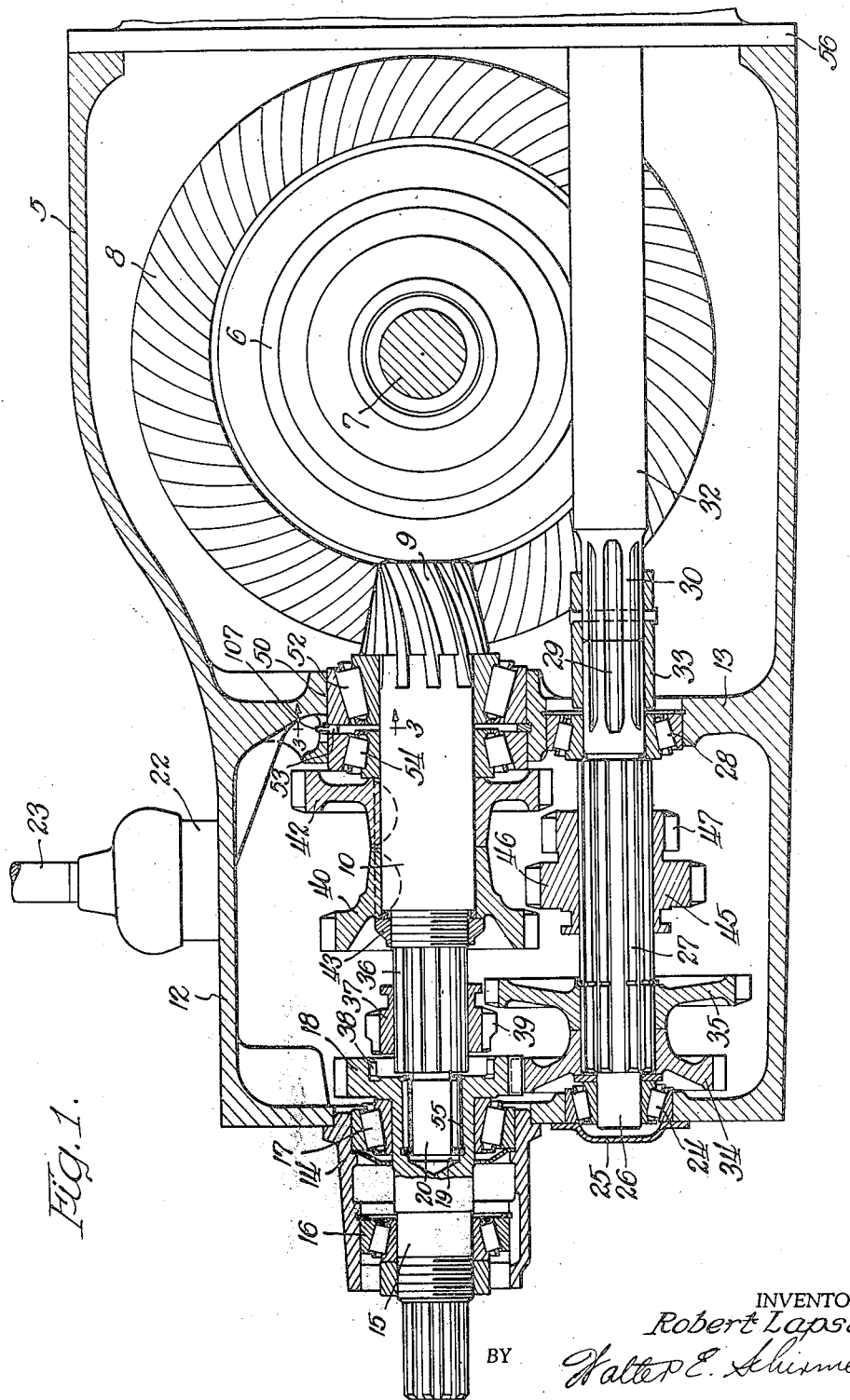
Figure 1 is a sectional view through a combined transmission and differential embodying the present invention.

Referring now in detail to Figure 1, the axle housing is indicated generally at 5, and is adapted to have suitably supported therein the differential case, indicated generally at 6, in which the opposite ends of the axle drive shafts 7 are inserted. The differential 6 is provided with the conventional spiral bevel ring gear 8 adapted to be driven by the pinion end 9 of the transmission tail shaft 10.

Extending forwardly from the housing 5 and formed integrally therewith is a housing portion 12 separated from the differential portion of the housing by the transverse partition 13. The housing 12 at its forward end is provided with a bearing cap 14 adapted to receive the drive shaft 15 which is supported by means of suitable tapered roller bearings 16 and 17 respectively. The drive shaft 15 is connected through a conventional clutch to the crankshaft of the vehicle engine, and, at its transmission end is provided with the enlarged drive gear portion 18 and the axial recess 19 receiving the stud end 20 of the main shaft 10. The upper part of the transmission housing is provided with the tower 22 within which is universally mounted the gear shift lever 23 for controlling the selection and shifting of the gears within the transmission.

The housing 12 is also provided with a bearing 24 closed by a suitable cap member 25 for supporting the stud end 26 of a splined countershaft 27, this countershaft extending through the bearings 28 in the transverse wall 13 and having the splined end 29 coupled to a corresponding splined end 30 of a motion transmitting shaft 32 by means of the internally splined sleeve 33.

The countershaft is provided with the gear 34 driven from the drive gear 18 at all times, and a second gear 35 is fixed on the shaft and rotates conjointly with the gear 34. The shaft 10 is provided with the splined portion 36 upon which is mounted the sliding clutch 37 which, when moved to its extreme left hand position, directly couples the drive gear 18 to the shaft through the internal clutch teeth 38. When shifted in the opposite direction, the external teeth 39 of the clutch 37 move into meshing engagement with the teeth of gear 35, whereby the shaft 10 is driven at an increased speed from the countershaft.

The shaft 10 is also provided with the gears 40 and 42, both keyed thereon and held in position by the lock nut 43. The gears 40 and 42 are selectively engageable by a sliding clutch member 45, which has a gear portion 46 engageable with the gear 40 when shifted to the left from its intermediate position, and has a gear portion 47 engageable with the gear 42 when shifted to the right from such neutral position. The transverse partition 13 is provided with an axially elongated bore 50 through which the shaft 10 extends, and a relatively large tapered roller bearing assembly 52 is inserted in this bore about the pinion end of the shaft, the inner race being held against movement by abutting against the rear end of the teeth 9, while the outer race is held in position by engagement with a snap ring 53 locked in an annular groove formed in the bore 50. This locates the bearing 52 in position to resist the axial thrusts on the shaft 10 caused by the spiral bevel gearing 8 and 9. To support the shaft against thrusts in the opposition direction, a smaller tapered roller bearing 54 is provided which has the outer race abutting against the ring 53 and has the inner race held in position by abutment against the hub portion of the gear 42. Thus it will be seen that in place of a double tapered roller bearing, which is relatively expensive, two single tapered bearings can be employed of different sizes, the bearing 52 being of sufficient size to resist the axial thrusts tending to drive the shaft 10 to the left, while the bearing 54 is of a smaller size to resist any thrust in the opposite direction. The opposite end of the shaft 10 is journalled by the plane roller or needle bearings within the recess 19 of the drive gear 18, and consequently all axial thrusts on the shaft 10 are taken by the bearings 52 and 54. This provides a very economical assembly inasmuch as there is no necessity for providing a radial lip at either end of the bore 50 to retain a double tapered bearing in position, and the bore can be machined straight through, thus reducing the cost of both the machining operation and of the bearings to a considerable extent.

The shaft 32 which is in axial alinement with the countershaft 27 extends through the differential housing 5 along side of the ring gear 8 and out of contact therewith. Preferably, this shaft is so arranged as to pass relatively close to the hub portion of the side gear driven by the differential mechanism and into which the axle shafts 7 are engaged. Bolted to the rear face of the housing 5 is a second housing member 56 which is shown more in detail in Figure 2. This housing 56 is adapted to receive the rear end of the shaft 32, this shaft being supported in a straight roller bearing 57 mounted in the end wall of the housing 56. Mounted on the end of the shaft 32 within the housing 56 is a clutch member 58 which is splined for driving engagement by the shaft 32, and which has an external gear portion 59 adapted to be shifted to the left into engagement with the internal gear tooth portion 60 of a compound gear member 62 suitably splined or keyed to the forward end 63 of a power takeoff shaft 64. The shaft 64 is provided with cam members 65 and 66 adapted to operate a suitable oil pump or the like for forcing lubricant into the various bearings of the gear system, or for any other use for which such oil pressure may be required. The compound gear member 62 is provided with the bevel gear portion 67 on the face portion thereof opposite the internal ring gear 60, which gear portion 67 is adapted to have meshing engagement with the bevel pinion 68 mounted on the belt pulley shaft 69. The belt pulley shaft 69 extends through a laterally projecting nose portion 70 of the housing 56, being suitably supported therein by means of the tapered bearings 72 and 73. The projecting end of the shaft 69 is tapered, as indicated at 74 and is provided with a key-way 75 whereby a drive pulley may be locked thereon by means of the locking nut 76. This pulley may be of any conventional type for driving belting attached to machinery driven from the tractor.

The forward end of the power takeoff shaft 64 is mounted in tapered bearings 77 carried in an offset straddle web 78 formed integral with the housing 56. The rear wall of the housing 56, indicated at 79, has a bearing portion receiving the tapered roller bearing 80 held in position by means of a shoulder on the shaft 64 and a bearing cap member 82 bolted to the rear wall 79, and having a flange portion carrying the oil seal 83 in the projecting end of the shaft 64 is splined to receive a splined sleeve for connecting it to a plough or similar agricultural implement drawn by the tractor.

It will be apparent that with this construction, whenever the clutch 58 is shifted axially on the splined end of the shaft 32 into engagement with the ring gear 60, a reduction drive to the power takeoff shaft 64 and to the belt pulley 69 will be provided. This drive will be effected regardless of whether or not the vehicle is moving, since the clutch 37 and the clutch 45 may both be in neutral position, but the countershaft will still be driven through the gears 18 and 34, thus transmitting drive to the power takeoff shaft 64 and the belt pulley shaft 69.

Figure 2:
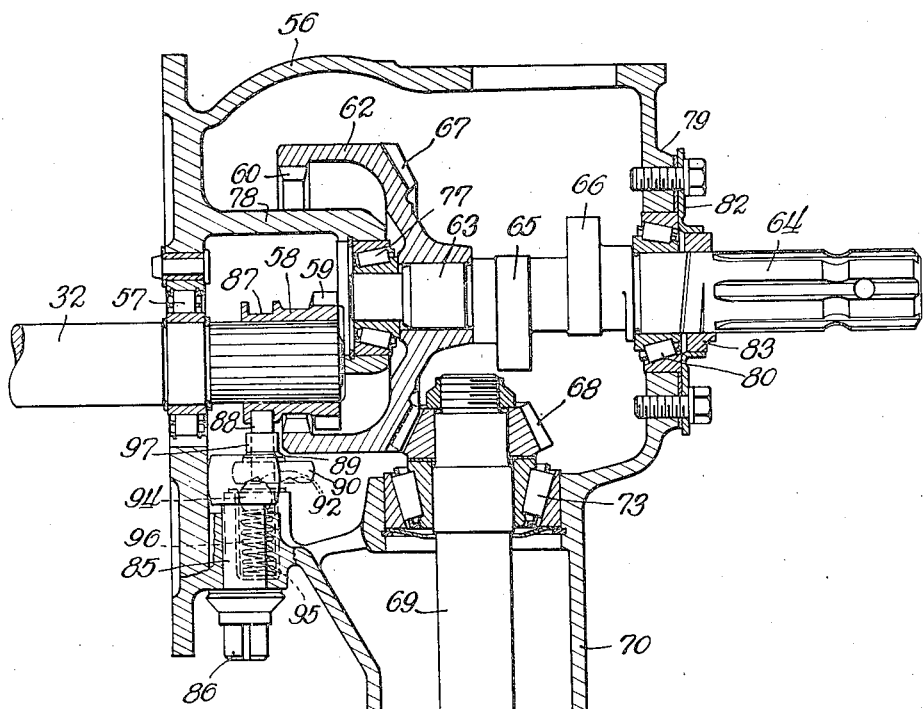
Figure 2 is a horizontal sectional view through the power takeoff and belt pulley connections for the transmission.

The mechanism for operating the clutch 58 is shown somewhat diagrammatically in Figure 2, and comprises a shaft member 85 extending through a boss portion formed in the housing 56 and having a projecting end 86 adapted to receive a lever keyed thereon for rotating the shaft 85. The clutch 58 is provided with a yoke collar 87 adapted to receive the squared end 88 of a shift member 89 pivoted in the housing 56 and having an elongated portion 90 provided with the detents 92 formed in the surface thereof. These detents are adapted to be engaged by a detent ball 94 carried in a socket 95 formed in the housing and having a spring 96 therein normally urging the ball outwardly into engagement with the respective detents. The shaft 85 is provided with an offset collar portion 97 engaging the shift lever 88 whereby, upon rotation of the shaft 85, the lever 88 is shifted to the left to shift the clutch 58 into driving engagement with the gear 60.

Figure 3:
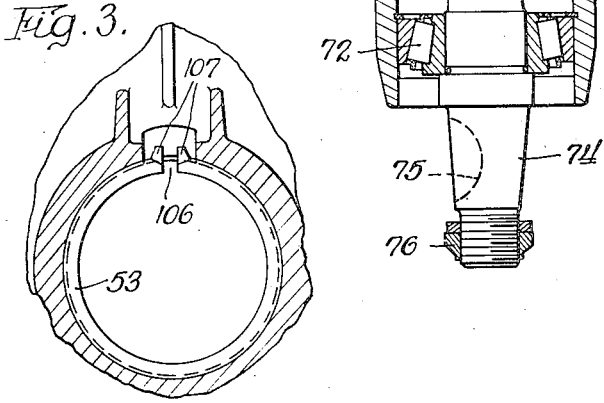
Figure 3 is a detail sectional view showing the means for lubricating the bearing arrangement.

Referring now to Figures 1 and 3, the means by which the bearings 54 and 52 are lubricated is shown in detail. It will be noted that the case 12 of the transmission is provided with a rib 100 above the bearing. This rib 100 is provided to catch and deflect oil splashed upwardly by the gear 42, the oil clinging to the surface of the rib and then draining into the oil passageway or basin 102 formed between the transverse partition 13 and leading to the retainer ring 53. This passageway is defined by the supporting wall 13, which also includes the spaced recess 104 forming a basin for receiving the oil. The oil feed hole 105 in this basin opens into the space 106 formed between the ends of the ring 53. It will be noted that the ends of the ring are spaced apart and are provided with the projections 107 which project beyond the normal outer diameter of the ring groove, thereby locating the ring in the oil feed hole against rotation and assuring that the opening 106 will always be presented in alinement with the port 105 for oil to feed therethrough between the outer races of the bearings 52 and 54. This provides a definite means for assuring lubrication of these races.

It is therefore believed apparent that I have provided a novel type of power takeoff and belt pulley drive for a tractor transmission, and have also provided an improved mounting arrangement for the transmission main shaft, reducing the cost of the construction considerably.

I am aware that various changes may be made in certain details of the present construction, and I therefore do not intend to be limited except as defined by the scope and spirit of the appended claims.

I claim:

1. Power take-off means comprising a housing adapted to be mounted on the rear face of a combined transmission and differential and having the transmission countershaft extended therethrough, a first shaft in said housing having a combination gear at one end thereof, shiftable pinion on the countershaft extension in said housing engageable with one gear portion of said combination gear for driving said first shaft, a second shaft in said housing at right angles to said first shaft and means comprising another gear portion carried on said combination gear for driving said second shaft and a bearing for said first shaft intermediate the gear portions of said combination gear.

2. Power take-off means comprising a housing adapted to be mounted on the rear face of a combined transmission and differential and having the transmission countershaft extended thereinto, a first shaft in said housing having a combination gear at one end thereof, a shiftable pinion on the countershaft extension in said housing engageable with one gear portion of said combination gear for driving said first shaft, a second shaft in said housing at right angles to said first shaft, means comprising another gear portion on said combination gear for driving said second shaft, said first shaft being laterally offset from the countershaft extension and said combination gear including an internal ring gear, said pinion comprising an axially shiftable external tooth member on said countershaft extension slidable into and out of engagement with said internal ring gear.

3. In power takeoff means, a housing adapted to be secured to a combined transmission and differential housing and receiving an extension of the transmission countershaft therein, a pair of shafts in said first housing extending at right angles to each other, gear means on said shafts providing driving engagement therebetween, one of said gear means including an internal ring gear portion, and shiftable pinion means in said housing driven from said countershaft extension for engaging said ring gear portion to drive said shafts.

ROBERT LAPSLEY.